INVENTORS
ROB ROY MacGREGOR
GEORGE ROBERT MULLER
WILLIAM PERCY MOORE

BY

AGENT

United States Patent Office 3,410,854
Patented Nov. 12, 1968

3,410,854
PRODUCTION OF TRIS(2-HYDROXYALKYL) ISOCYANURATE
Rob Roy MacGregor and George Robert Muller, Hopewell, and William Percy Moore, Chester, Va., assignors to Allied Chemical Corporation, New York, N.Y., a corporation of New York
Filed Dec. 14, 1964, Ser. No. 417,901
3 Claims. (Cl. 260—248)

ABSTRACT OF THE DISCLOSURE

A continuous process of preparing tris(2-hydroxyethyl) isocyanurate which includes the preparing of a slurry mixture of cyanuric acid and dimethyl formamide having a pH ranging from about 4.75 to 5.6, and adding said slurry with ethylene oxide to a reactor zone. Tris(2-hydroxyethyl) isocyanaurate is an intermediate useful in the production of polyester adducts, synthetic resins, foams and the like.

---

This invention relates to an improved process for the continuous manufacture of tris-(2-hydroxyalkyl) isocyanurates.

The preparation of tris-(2-hydroxyalkyl) isocyanurates, as the reaction product of an alkylene oxide and cyanuric acid (CA) is broadly described in United States Letters Patent No. 3,088,948 to Allied Chemical Corporation. This patent teaches a batch process requiring use of alkaline catalyst. It is the object of the present invention to provide an improved process for the manufacture of tris-(2-hydroxyalkyl) isocyanurates at high yields.

In accordance with the present invention an alkylene oxide containing 2 to 4 carbon atoms in the molecule is reacted with CA the CA mol ratio ranging between 3 and 4.5; the CA being at least partially dissolved in an inert solvent; and the pH of the CA solution-slurry ranging between 4.75 and 5.6.

Figure 1:
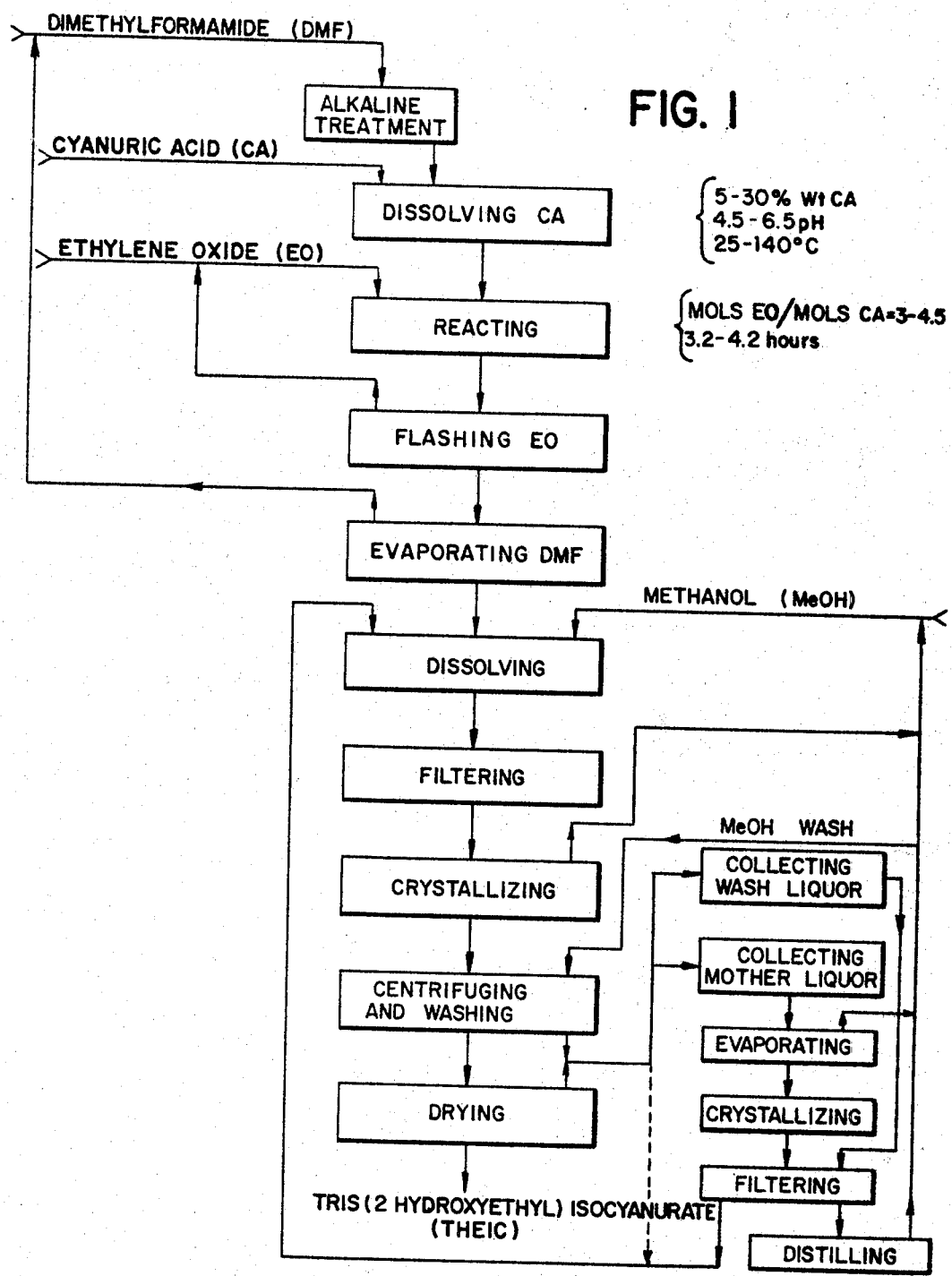

The invention is further described with reference being had to the accompanying drawing wherein:

FIG. 1 is a flow sheet of a preferred, continuous embodiment of the process of the invention showing the manufacture of tris - (2 - hydroxyethyl) isocyanaurate (THEIC); and FIGS. 2–5 are graphs illustrating the effects of the process parameters upon the yield of THEIC.

Figure 2:
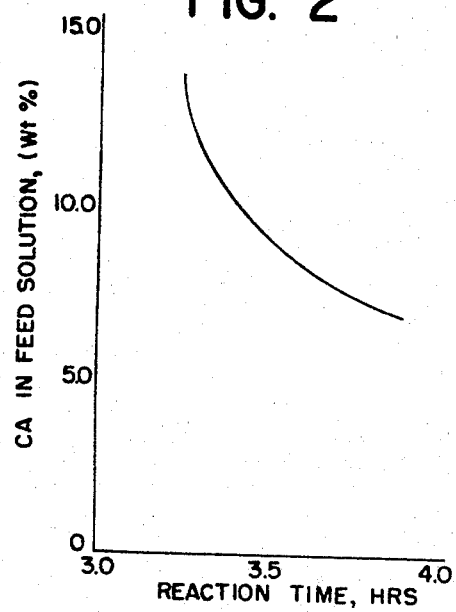

The steps of the preferred embodiment of the process of the invention are shown in FIG. 1. CA is at least partially dissolved in an inert solvent, such as dimethyl formamide (DMF), forming a slurry which contains 5–30% by wt., preferably 10–20% by wt. CA. FIG. 2 shows the relationship between concentration of CA in the feed solution at substantially uniform pH, and the reaction time indicating a desirability to maintain a minimum CA concentration of at least about 5% by wt. and preferably 10%. When the concentration of the feed slurry exceeds 20% by wt. CA the viscosity of the slurry increases rapidly making pumping or stirring thereof increasingly difficult. The CA slurry is maintained at a temperature of beween 25° C. and 140° C., preferably between 100–140° C.

It is an important feature of the invention that the pH of the CA feed slurry should be maintained between 4.5 and 6.5, preferably between 4.75 and 5.6 for highest yields in the end product. The desired pH of the CA slurry can be controlled by varying the CA concentration. Since commercial inert solvents are often of unpredictable alkalinity, and the solvent being recycled to the slurrying stage in accordance with the process of the present invention has a nonconstant pH, the DMF to be used as a solvent for the starting CA is pretreated such as by trickling it through a bed of sodium hydroxide pellets before feeding the DMF to the dissolving vessel to prepare the slurry. A variation of the time of contact between the DMF and the caustic can also be used to adjust the pH of the slurry. The measurement of pH of the slurry is accomplished by adding water prior to the measurement to a small sample of the solution. Generally the dilution of a 25 cc. sample to 100 cc., was found to give accurate results.

The CA slurry is continuously fed from the dissolving or slurrying stage, together with 3–4.5 mols, preferably 3.8–4.2 mols ethylene oxide (EO) for each mol of CA, to a reactor stage. Reaction is preferably carried out in a cocurrent, agitated, and baffled vessel provided with a water jacket to permit temperature maintainance. As cyanuric acid is consumed in the reaction, the pH of the reaction mixture tends to rise until reaching a maximum pH of 7.2 to 8.6. The dwell time of the reactants in the reactor is between 1.5 and 5 hours, preferably between 3.2 and 4.2 hours. Dwell time within the reactor can be adjusted by varying the composition of the reactants, and also by varying the reaction temperature.

In the preferred process of the invention, the end product is obtained through a number of subsequent steps which also serve for the recovery of other chemicals for possible recycle. The unreacted EO in the THEIC solution exiting from the reactor is flash-evaporated and recycled to the reactor. Subsequently solution is filtered and the DMF solvent is removed, such as by vacuum distillation in a thin film type evaporator, and is recycled for use in the process. The bottom of the DMF evaporator contains THEIC and by-products which are fed to a dissolving tank together with methanol as solvent. In the dissolver the methanol solution is preferably maintained near its boiling point and a reflux condenser can be used to prevent loss of solvent.

The solution is subsequently filtered, for example, by pumping through a carbon bed, to remove color forming impurities and is then fed to a crystallizer. The hot THEIC solution is cooled in the crystallizer, to about 0–5° C., by flashing the methanol under vacuum. Agitation is normally provided during crystallization. Crystallized THEIC is separated from the mother liquor by centrifuging and is washed with further amounts of methanol before drying. Mother liquor and/or washing methanol can be recirculated to the dissolving stage, as indicated by the broken line in FIG. 1. The THEIC crystals are advantageously dried in a steam coil-heated unit provided with a dust collecting system to prevent the loss of THEIC.

The mother liquor and wash liquor from the centrifuge can be collected, as shown by the solid lines in the flow sheet (FIG. 1). Methanol can then be recovered from the wash liquor by distillation and from the mother liquor by evaporation for recycle to the process. The evaporator bottoms are treated to crystallize any remaining THEIC and then recycled to the THEIC recovery steps of the process, as indicated in FIG. 1.

The following examples disclose the best mode contemplated for carrying out the process of the present invention. It is to be understood that the invention is not to be construed as limited to any of the details of the examples. Unless specified otherwise, parts and percentages are by weight, and temperature is expressed in ° C.

Example 1

The process of this example was carried out in accordance with the steps illustrated in FIG. 1. 99 parts/hr. CA and 615 parts/hr. DMF were mixed in the dissolving tank at 25° C. Prior to the mixing of the two components, the DMF was passed through an approximately 3 foot thick bed of sodium hydroxide pellets, the bed having a 12 in. diameter to neutralize the acidic contaminants in the DMF. The CA was partially dissolved in the DMF, producing a slurry having a pH of 5–6. The slurry was heated to 105° C. by circulation through a heat exchanger. The heated slurry was pumped together with 133 parts/hr. EO to a 12″ diameter by 20 ft. high reactor, containing perforated plates which divided the reactor into four compartments. The reactor had four baffles each 1¼″ wide running the full length of the vessel and it was also equipped with a 4″ diameter turbine blade agitator in each compartment with a rotation speed of 200 r.p.m. The reactor provided four hours retention time for the reacting mixture. The reactants were maintained at a temperature between 105 and 110° C. in the reactor. A pressure of about 10 p.s.i.g. was also maintained in the reactor to minimize the action of boiling EO. The exiting product solution had about 7.5 pH.

After the unreacted EO was flashed off in an atmospheric pressure separator, the resulting product contained 75.3% DMF and 24.7% THEIC and by-products.

The DMF was removed by vacuum distillation and 435 parts/hr. methanol recycled from a later step of the process and containing 110 parts/hr. THEIC (broken line in FIG. 1) was added to the remaining THEIC and by-products. After filtering, crystallization, centrifuging, and drying, 180 parts/hr. dry THEIC was recovered in the principal product stream in accordance with the process of FIG. 1. The 90 parts/hr. methanol taken as overhead from the centrifuged mother liquor and wash liquor was recirculated as indicated by the broken line in FIG. 1.

Overall process recovery of THEIC was 85.7% of theory based on the amount of cyanuric acid fed to the reaction.

Example 2

Figure 3:
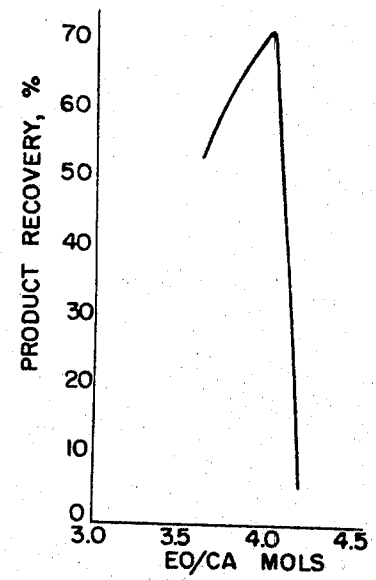
Figure 4:
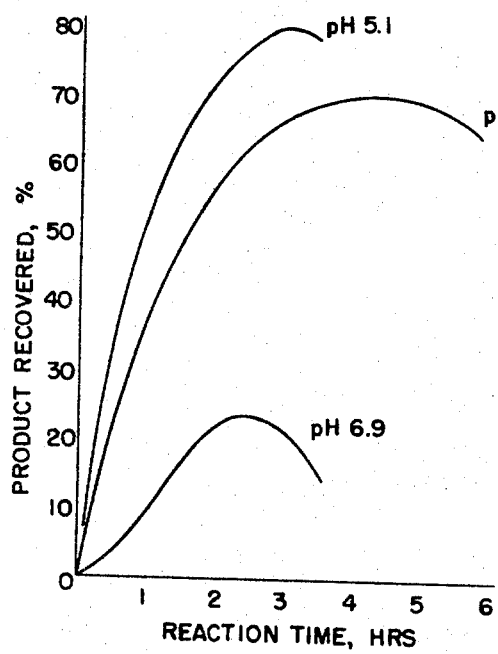

A series of test runs were carried out in accordance with the process described in Example 1. The pH of the feed slurry was maintained in the range of 5.2–5.9. The CA content of the feed was a constant 10% and the EO/CA mol ratio was varied between 3.6 and 4.2 giving a maximum product yield based on theoretical yield, at a mol ratio of 4, as shown in FIG. 3.

Example 3

Figure 5:
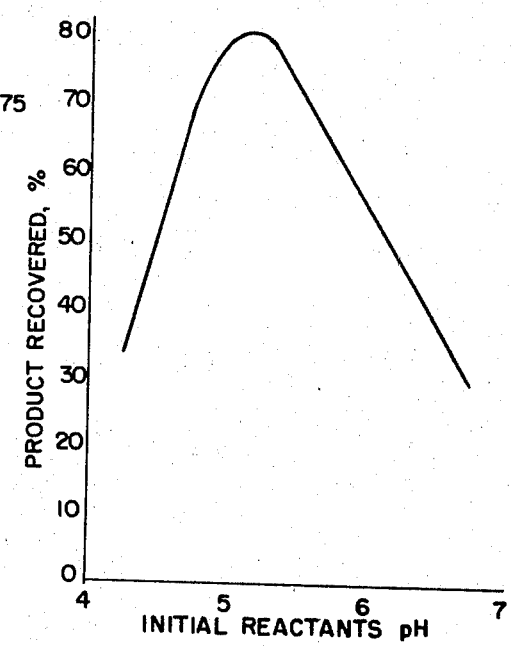

A series of runs were carried out in a 22 liter closed reactor fitted with a reflux condenser. In each case 6000 parts DMF and 1040 parts CA were used, the slurry having a 4.75, 5.15, and 6.9 pH, respectively. The contents of the reactor was heated to 103° C. and EO was added over a period of about 2 hours until 1100 parts were added altogether in each case. Samples each of about 750 parts were periodically withdrawn to determine the progress of the reaction. DMF was removed by evaporation at 105° C. and the residue was dissolved in twice its weight of methanol kept under reflux. The solution was filtered while hot and cooled to 0° C. and crystallized; the product slurry was filtered and the recovered THEIC was washed with cold methanol and dried in a forced air oven at 100° C. Product recovery, based on the theoretical, was calculated and is shown as a function of reaction time in FIG. 4. FIG. 5 is a cross plot of the values of FIG. 4, clearly showing the criticality of the feed pH.

Examples 4–6

Three runs were conducted in the reactor of Example 1. The three runs were conducted in accordance with the process of Example 1, varying the concentration of CA in the feed slurry. Ethylene oxide was continuously pumped through the reactor bottom in such a way to maintain the EO/CA mol ratio at 3.9. The reaction parameters and product data are given below. Reaction time for varying concentration of CA feed is shown in FIG. 2.

|  | Example No. | | |
| --- | --- | --- | --- |
|  | 4 | 5 | 6 |
| CA, percent in feed | 7.0 | 10.0 | 14.0 |
| Temperature at reactor top | 110 | 110 | 110 |
| Temperature reactor bottom | 107 | 108 | 106 |
| Average reaction time, hours | 3.92 | 3.85 | 3.23 |
| Mol ratio EO/CA | 4.39 | 4.0 | 3.9 |
| Feed slurry, pH | 5.6 | 5.5–5.6 | 5.5 |
| Reactor exit, pH | 7.9–8.0 | 7.7–8.4 | 7.4–8.6 |
| Product recovery, percent | 67.8 | 67.2 | 68.2 |
| Product melting point | 134–5 | 133–6 | 134–6 |

Example 7

14 parts CA was slurried in 86 parts DMF. The slurry had 5.5 pH. 18.9 parts propylene oxide were added to the slurry and the reaction mixture was kept at about 130° C. for slightly over 3 hours. The reactor effluent yielded 29.3 parts tris-(2-hydroxypropyl) isocyanurate, corresponding to a yield of 89% based on the consumed CA.

We claim.

1. A continuous method for producing tris(2-hydroxyalkyl)isocyanurate, which comprises, feeding a mixture of cyanuric acid and inert solvent ranging from 5 to 30% based on the weight of the mixture and having a pH between 4.5 and 6.5 with 3–4.5 mols alkylene oxide for each mol of cyanuric acid as reaction mixture continuously in a reaction zone at a temperature between 25° C. and 140° C., maintaining the reaction mixture in the reaction zone for a period between 1.5 and 4.2 hours, evaporating unreacted alkylene oxide, evaporating the solvent, recovering tris(2-hydroxyalkyl)isocyanurate from the reaction products, recirculating said evaporated alkylene oxide and solvent for reuse, and preparing a mixture of said recirculated solvent and cyanuric acid to a range between 4.5 and 6.5 for further production of tris(2-hydroxyalkyl)isocyanurate.

2. A method for the continuous manufacture of tris(2-hydroxyethyl)isocyanurate, which comprises preparing a 10–20%, based on the weight of the mixture, of cyanuric acid-containing mixture with dimethylformamide having a pH in the excess of 7, the pH of the mixture being between 4.75 and 5.6, maintaining the temperature of the mixture between 100° C. and 140° C., contacting the mixture with 3–4.5 mols of ethylene oxide per mol cyanuric acid in the mixture in a cocurrent heated baffled reactor for a period between 1.5 and 5 hours, evaporating from the reactor effluent free ethylene oxide for recirculation, then evaporating dimethylformamide for recirculation, dissolving the residue in methanol, and recovering the tris(2-hydroxyethyl)isocyanurate end product as well as methanol for recirculation.

3. The method of claim 2, wherein said step of recovering said end product and said methanol comprises crystallizing tris(2-hydroxyethyl)isocyanurate from said solution, and separating the crystals from the mother liquor, and recovering at least part of the mother liquor for recirculation.

References Cited

UNITED STATES PATENTS

| 3,088,948 | 5/1963 | Little et al. | 260—248 |
| 3,231,577 | 1/1966 | Walles | 260—248 |
| 3,265,694 | 8/1966 | Walles et al. | 260—248 |
| 3,313,812 | 4/1967 | Churchill et al. | 260—248 |

JOHN D. RANDOLPH, Primary Examiner.

J. M. FORD, Assistant Examiner.